US012679130B2

(12) United States Patent
Kato et al.

(10) Patent No.: US 12,679,130 B2
(45) Date of Patent: Jul. 14, 2026

(54) METHOD OF TRANSFER PRINTING ON TATAMI MAT COVER, TATAMI MAT COVER

(71) Applicant: SEIKO EPSON CORPORATION, Tokyo (JP)

(72) Inventors: Hideki Kato, Matsumoto (JP); Mugio Kawasaki, Suwa (JP); Masahiro Ogihara, Okaya (JP); Yusuke Kato, Shiojiri (JP); Nobuyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 18/358,092

(22) Filed: Jul. 25, 2023

(65) Prior Publication Data

US 2024/0025196 A1 Jan. 25, 2024

(30) Foreign Application Priority Data

Jul. 25, 2022 (JP) ................................. 2022-117789

(51) Int. Cl.

| | |
|---|---|
| ***B41M 5/035*** | (2006.01) |
| ***B41M 5/025*** | (2006.01) |
| *E04F 15/10* | (2006.01) |

(52) U.S. Cl.

CPC .......... *B41M 5/035* (2013.01); *B41M 5/0256* (2013.01); *B41M 5/0358* (2013.01); *E04F 15/10* (2013.01)

(58) Field of Classification Search

CPC ...... B41M 5/0256; B41M 5/03; B41M 5/035; B41M 5/0358; E04F 15/10

See application file for complete search history.

(56) References Cited

U.S. PATENT DOCUMENTS 5,580,410 A * 12/1996 Johnston ............ B41M 5/38207 156/240

2013/0205517 A1* 8/2013 Oguchi .................... D06P 5/004 8/579

FOREIGN PATENT DOCUMENTS

| | | | |
|---|---|---|---|
| JP | S63218399 A | * | 9/1988 |
| JP | 2005048561 A | * | 2/2005 |
| JP | 2007-162442 A | | 6/2007 |

* cited by examiner

*Primary Examiner* — Gerard Higgins

(74) *Attorney, Agent, or Firm* — WORKMAN NYDEGGER

(57) ABSTRACT

A method of transfer printing on a tatami mat cover includes a printing step for performing printing on an intermediate transfer medium using a color ink composition containing a sublimable dye, a water-soluble organic solvent, and water, and a transfer step for transferring the print on the intermediate transfer medium to a tatami mat cover, wherein the transfer step is performed under conditions of a heating temperature of from 170° C. to 180° C., a pressure of from 0.5 kg/cm$^2$ to 0.6 kg/cm$^2$, and a heating time of from 60 seconds to 180 seconds.

3 Claims, 4 Drawing Sheets

| | HEATING TEMPERATURE [°C] | PRESSURE [kg/cm²] | HEATING TIME [SEC.] | DISCOLORATION OF TATAMI MAT COVER | BLEEDING | COLOR DEVELOPMENT | OVERALL EVALUATION |
|---|---|---|---|---|---|---|---|
| COMPARATIVE EXAMPLE 1 | 150 | 0.6 | 180 | ABSENT | A | D | D |
| COMPARATIVE EXAMPLE 2 | 160 | 0.6 | 180 | ABSENT | A | D | D |
| EXAMPLE 1 | 170 | 0.6 | 90 | ABSENT | B | C | C |
| EXAMPLE 2 | 170 | 0.6 | 120 | ABSENT | B | B | B |
| EXAMPLE 3 | 170 | 0.6 | 180 | ABSENT | A | A | A |
| EXAMPLE 4 | 180 | 0.5 | 60 | ABSENT | B | A | B |
| EXAMPLE 5 | 180 | 0.5 | 90 | ABSENT | B | A | B |
| EXAMPLE 6 | 180 | 0.5 | 120 | ABSENT | C | A | C |
| COMPARATIVE EXAMPLE 3 | 185 | 0.6 | 60 | PRESENT | D | A | D |
| COMPARATIVE EXAMPLE 4 | 190 | 0.6 | 60 | PRESENT | D | A | D |
| COMPARATIVE EXAMPLE 5 | 200 | 0.6 | 60 | PRESENT | D | A | D |

FIG. 4

METHOD OF TRANSFER PRINTING ON TATAMI MAT COVER, TATAMI MAT COVER

The present application is based on, and claims priority from JP Application Serial Number 2022-117789, filed Jul. 25, 2022, the disclosure of which is hereby incorporated by reference herein in its entirety.

BACKGROUND

1. Technical Field

The present disclosure relates to a method of transfer printing on a tatami mat cover and relates to a tatami mat cover.

2. Related Art

In the related art, such as what is disclosed in JP 2007-162442 A, a known method of printing on a tatami mat includes performing screen printing on a tatami mat cover using an oil-based base ink, and printing a pattern composed of water-based color ink on the upper surface of the oil-based base ink using an ink jet-type color printer.

However, in recent years, there are tatami mat covers that have been surface-treated with fluorine or the like. As such, the image quality deteriorates when a known printing method is used.

SUMMARY

A method of transfer printing on a tatami mat cover includes a printing step for performing printing on an intermediate transfer medium using a color ink composition containing a sublimable dye, a water-soluble organic solvent, and water, and a transfer step for transferring the print on the intermediate transfer medium to a tatami mat cover, wherein the transfer step is performed under conditions of a heating temperature of from 170° C. to 180° C., a pressure of from 0.5 kg/cm$^2$ to 0.6 kg/cm$^2$, and a heating time of from 60 seconds to 180 seconds.

A tatami mat cover is produced by the above-mentioned method of transfer printing on a tatami mat cover.

BRIEF DESCRIPTION OF THE DRAWINGS

FIG. 4 is a chart presenting embodiments.

DESCRIPTION OF EXEMPLARY EMBODIMENTS

First, a method of transfer printing on a tatami mat cover will be described.

Figure 1:
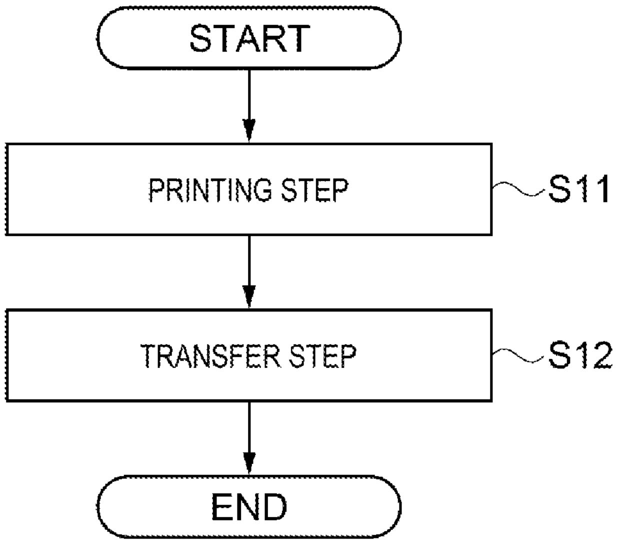
FIG. 1 is a flowchart illustrating a method of transfer printing on a tatami mat cover.

As illustrated in FIG. 1, a method of transfer printing on a tatami mat cover includes a printing step (Step S11) for performing printing on an intermediate transfer medium Ma using a color ink composition containing a sublimable dye, a water-soluble organic solvent, and water, and a transfer step (Step S12) for transferring the print on the intermediate transfer medium Ma to a tatami mat cover M.

First, in the printing step (Step S11), the color ink composition is ejected onto the intermediate transfer media Ma by a recording device 10, printing (recording) an image or the like on the intermediate transfer media Ma.

Figure 2:
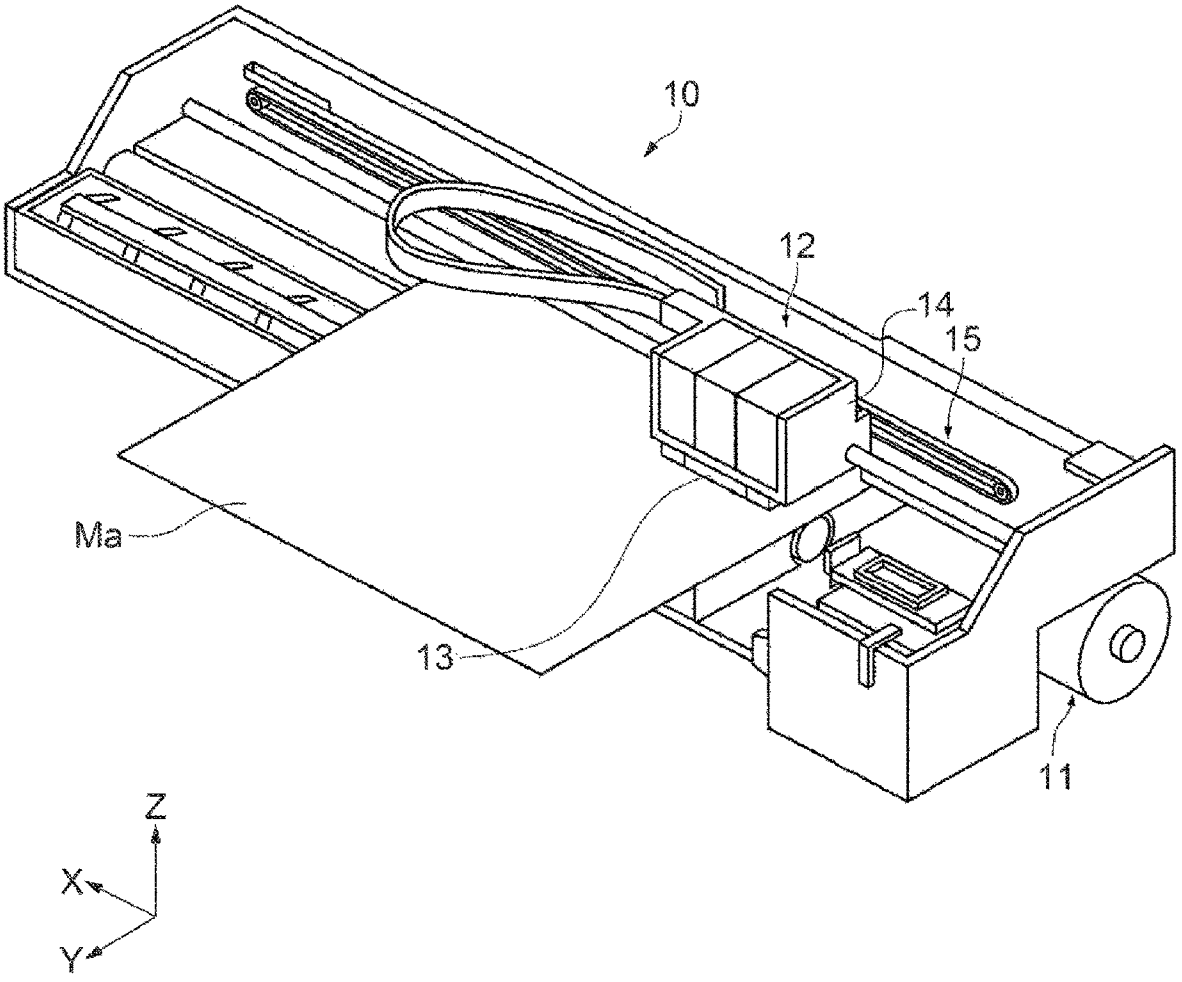
FIG. 2 is a schematic diagram illustrating a configuration of a recording device.

As illustrated in FIG. 2, the recording device 10 is an ink jet printer that attaches the color ink composition to the intermediate transfer medium Ma. The recording device 10 is provided with a transport unit 11 and a recording unit 12. The transport unit 11 transports the intermediate transfer medium Ma fed to the recording device 10 to the recording unit 12, and ejects the intermediate transfer medium Ma that was subjected to recording to the outside of the recording device 10. Specifically, the transport unit 11 includes feed rollers and transports the intermediate transfer medium Ma fed to the recording device 10 in a sub scanning direction (+Y direction).

The recording unit 12 includes a head 13, a carriage 14, and a carriage moving mechanism 15. The head 13 has a nozzle that ejects the color ink composition as droplets onto the intermediate transfer medium Ma transported from the transport unit 11. The carriage 14 has the head 13 mounted thereon. The carriage moving mechanism 15 moves the carriage 14 in a primary scanning direction (a direction along the X-axis) of the intermediate transfer medium Ma.

The head 13 of this embodiment has a length smaller than a width of the intermediate transfer medium Ma along the X-axis. As such, recording is carried out by moving the head 13 in the direction along the X-axis and performing a plurality of passes (multiple passes). Note that “pass” is also referred to as “main scanning”. Between passes, the intermediate transfer medium Ma is transported in the +Y direction. This is also referred to as “sub scanning”. That is, the intermediate transfer medium Ma is subjected to a recording process in which main scanning and sub scanning are performed alternately.

Note that, the recording device 10 is not limited to the serial-type device described above, and may be a line-type device.

Next, the color ink composition will be described.

The color ink composition contains a sublimable dye, a water-soluble organic solvent, and water, and may contain a surfactant, a dispersant, and the like as necessary.

Sublimable Dye

In this embodiment, a “sublimable dye” is a dye that sublimates when heated. Examples of such a sublimable dye include, but are not limited to, C.I. Disperse Yellow 3, 7, 8, 23, 39, 51, 54, 60, 71, 86; C.I. Disperse Orange 1, 1:1, 5, 20, 33, 56, 76; C.I. Disperse Brown 2; C.I. Disperse Red 11, 53, 55, 55:1, 59, 60, 65, 70, 75, 93, 146, 158, 190, 190:1, 207, 239, 240; C.I. Disperse Violet 8, 17, 23, 27, 28, 29, 36, 57; and C.I. Disperse Blue 14, 19, 26, 26:1, 35, 55, 56, 58, 64, 64:1, 72, 72:1, 81, 81:1, 91, 95, 108, 131, 141, 145, 359.

Water-Soluble Organic Solvent

Examples of the water-soluble organic solvent include, but are not limited to, glycerin; a glycol such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; a glycol monoether such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and triethylene glycol monobutyl ether; a nitrogen-containing solvent such as 2-pyrrolidone, N-methyl-2-pyrrolidone, and N-ethyl-2-pyrrolidone; and an alcohol such as methanol, ethanol, n-propyl alcohol, iso-propyl alcohol, n-butanol, 2-butanol, tert-butanol, iso-butanol, n-pentanol, 2-pentanol, 3-pentanol, and tert-pentanol. Note that, these water-soluble organic solvents may be used alone or in a combination of two or more types.

Among them, glycerin, a glycol, and a glycol monoether are preferable, and glycerin, propylene glycol, and triethylene glycol monomethyl ether are more preferable. With the use of such water-soluble organic solvent, the transferability in a low duty portion tends to improve further.

The content of the water-soluble organic solvent with respect to the total amount of the color ink composition is preferably from 7.5 to 35 mass %, more preferably from 10 to 30 mass %, and still more preferably from 15 to 25 mass %. When the content of the water-soluble organic solvent is within the above range, the ejection stability improves further, and the wettability with respect to the intermediate transfer medium as well as the transferability in a low duty portion tend to improve further.

Water

The content of water with respect to the total amount of the color ink composition is preferably from 60 to 90 mass %, more preferably from 65 to 85 mass %, and still more preferably from 70 to 80 mass %.

Surfactant

The surfactant is not limited, and examples thereof include an acetylene glycol-based surfactant, a fluorine-based surfactant, and a silicone-based surfactant. Note that, these surfactants may be used alone or in a combination of two or more types.

The acetylene glycol-based surfactant is not limited, but is preferably, for example, one or more selected from the group consisting of 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol.

The fluorine-based surfactant is not limited, and examples thereof include a perfluoroalkyl sulfonate, a perfluoroalkyl carboxylate, a perfluoroalkyl phosphate ester, a perfluoroalkyl ethylene oxide adduct, a perfluoroalkyl betaine, and a perfluoroalkyl amine oxide compound.

Examples of the silicone-based surfactant include a polysiloxane-based compound and a polyether-modified organosiloxane.

Among them, a silicone-based surfactant is more preferable. With the use of such surfactant, the ejection stability improves further, and the wettability with respect to the intermediate transfer medium as well as the transferability in a low duty portion tend to improve further.

The content of the surfactant with respect to the total amount of the color ink composition is preferably from 0.1 to 2.0 mass %, more preferably from 0.2 to 1.5 mass %, and still more preferably from 0.3 to 1.0 mass %. When the content of the surfactant is within the above range, the ejection stability improves further, and the wettability with respect to the intermediate transfer medium as well as the transferability in a low duty portion tend to improve further.

Dispersant

The color ink composition may contain a dispersant. With the inclusion of the dispersant, the dispersion stability of the sublimable dye, the storage stability, the discharge stability, and the like tend to improve further. The dispersant is not limited, and examples thereof include an anionic dispersant, a nonionic dispersant, and a polymer dispersant. Note that, these dispersants may be used alone or in a combination of two or more types.

The anionic dispersant is not limited, and examples thereof include a formalin condensate of an aromatic sulfonic acid, a formalin condensate of a β-naphthalene sulfonic acid, a formalin condensate of an alkyl naphthalene sulfonic acid, and a formalin condensate of a creosote oil sulfonic acid.

Examples of the aromatic sulfonic acid include, but are not limited to, an alkyl naphthalene sulfonic acid such as a creosote oil sulfonic acid, a cresol sulfonic acid, a phenolsulfonic acid, a β-naphthol sulfonic acid, a methylnaphthalene sulfonic acid, and a butyl naphthalene sulfonic acid, a mixture of a β-naphthalene sulfonic acid and a β-naphthol sulfonic acid, a mixture of a cresol sulfonic acid and a 2-naphthol-6-sulfonic acid, and a lignin sulfonic acid.

The nonionic dispersant is not limited, and examples thereof include an ethylene oxide adduct of phytosterol and an ethylene oxide adduct of cholestanol.

The polymer dispersant is not limited, and examples thereof include a polyacrylic acid partial alkyl ester, a polyalkylene polyamine, a polyacrylate, a styrene-acrylic acid copolymer, and a vinyl naphthalene-maleic acid copolymer.

The content of the dispersant with respect to the total amount of the sublimable dye is preferably from 1 to 200 mass %, and more preferably from 50 to 150 mass %. When the content of the dispersant is within the above range, the dispersion stability of the sublimable dye, the storage stability, the discharge stability, and the like tend to improve further.

Other Additives

The color ink composition may further contain, when necessary, an antifungal agent, a preservative, an antioxidant, an UV absorber, a chelating agent, an oxygen absorber, a pH adjuster (for example, triethanolamine, adipic acid, and potassium hydroxide), a dissolution aid, and other various additives that can be used in an ordinary ink. Note that, these additives may be used alone or in a combination of two or more types.

Next, the intermediate transfer medium Ma will be described.

The intermediate transfer medium Ma may be, for example, paper such as plain paper, or a recording medium provided with an ink receiving layer (referred to as inkjet paper, coated paper, or the like). However, the intermediate transfer medium Ma is more preferably paper provided with an ink receiving layer composed of inorganic particles such as silica. In this way, the intermediate transfer medium Ma has less bleed-through or the like on the recording surface when the color ink composition applied to the intermediate transfer medium Ma is being dried. In addition, with such intermediate transfer medium Ma, the sublimable dye is more easily retained on the front surface of the recording surface, and the sublimation of the sublimable dye in the subsequent transfer step is more efficient.

Next, the transfer step (Step S12) will be described. In the transfer step (Step S12), the image is transferred from the intermediate transfer media Ma that was subjected to printing to the tatami mat cover M by a transfer printing device 20. The transfer printing device 20 of this embodiment thermo-compression bonds the color ink composition on the intermediate transfer medium Ma to the tatami mat cover M.

The tatami mat cover M is a component of a tatami mat and is the surface layer of a tatami mat. The tatami mat cover M is a woven mat-like member formed by weaving soft rush straws into warp threads.

Figure 3:
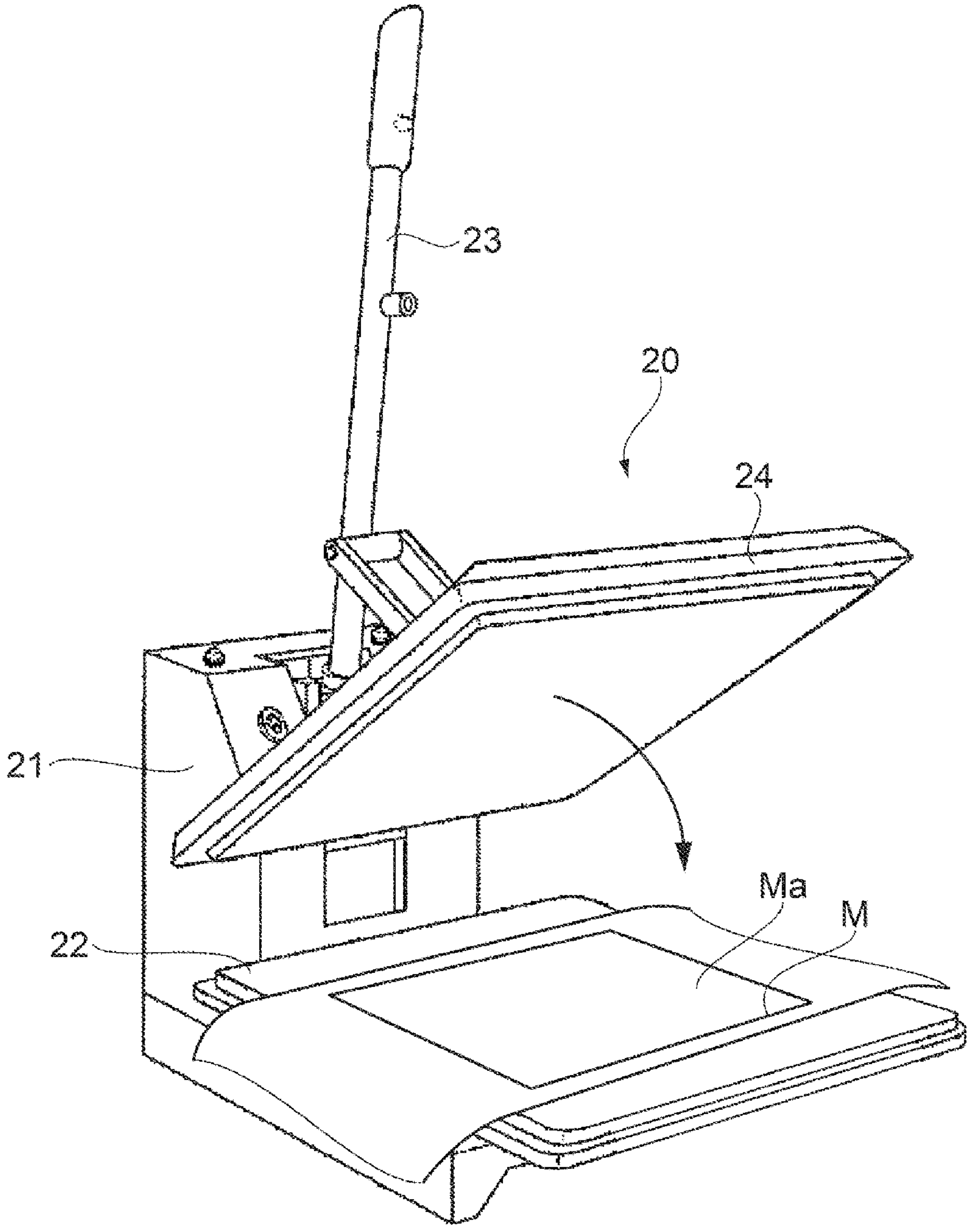
FIG. 3 is a schematic diagram illustrating a configuration of a transfer printing device.

As illustrated in FIG. 3, the transfer device 20 includes a device body 21 provided with a power supply, a controller, and the like, a work stage 22 provided on the device body 21, a handle 23 connected to the device body 21, and a heating plate 24 that moves up and down as the handle 23 moves up and down.

The heating plate 24 can be set to a predetermined temperature. Further, a timer is installed on the device body 21 and notifies an operator when a predetermined time elapses.

In the transfer step (Step S12), first, the tatami mat cover M is placed on the work stage 22 while the heating plate 24 is away from the work stage 22. Next, the intermediate transfer medium Ma is placed on the tatami mat cover M with the tatami mat cover M and the recording surface of the intermediate transfer medium Ma facing each other. Then, the handle 23 is pulled toward the front and thus is moved downward. Along with that, the heating plate 24 moves downward and presses the tatami mat cover M and the intermediate transfer medium Ma with a predetermined pressure. Accordingly, the sublimable dye on the intermediate transfer medium Ma sublimates and is thermo-compression bonded to the tatami mat cover M. Thereafter, when a predetermined time elapses, the handle 23 is pulled upward. Along with that, the heating plate 24 moves upward, and the heating plate 24 is moved away from the work stage 22. Thereafter, the tatami mat cover M and the intermediate transfer medium Ma are retrieved from the work stage 22, and the intermediate transfer medium Ma is peeled off from the tatami mat cover M. This results in the tatami mat cover M to which the image is transferred.

Here, the heating temperature in the transfer step (Step S12) is preferably from 170° C. to 180° C. When the heating temperature is lower than 170° C., the transfer efficiency with regards to the tatami mat cover M is reduced. In addition, the color development of the image transferred to the tatami mat cover M tends to decrease. Meanwhile, when the heating temperature exceeds 180° C., the tatami mat cover M may be discolored due to heating. Note that, the heating temperature can be set as appropriate depending on the form, such as the thickness, of the intermediate transfer medium Ma.

The heating time is preferably from 60 seconds to 180 seconds. The pressure in the transfer step is preferably from 0.5 $kg/cm^2$ to 0.6 $kg/cm^2$. Note that, the heating time can be set as appropriate depending on the form, such as the thickness, or the heating temperature of the intermediate transfer medium Ma.

In this way, high image quality can be realized even if the tatami mat cover M has been surface-treated.

Note that, a preheating step for heating the tatami mat cover M under conditions of a heating temperature of from 170° C. to 180° C. and a heating time of from 60 seconds to 180 seconds may be provided after the printing step (Step S11) and before the transfer step (Step S12). In the preheating step, the transfer device 20 heats the front surface of the tatami mat cover M to which the image or the like will be transferred.

In this way, the tatami mat cover M is heated before the transfer, which improves the adhesion of the color ink composition during the transfer and further improves the color development.

Further, in the preheating step, the tatami mat cover M may be pressed under a condition of a pressure of from 0.5 $kg/cm^2$ to 0.6 $kg/cm^2$.

As a result, fuzzes or the like at the front surface of the tatami mat cover M are pressed flat by the heating plate 24, and thus transfer of the color ink composition can be carried out smoothly.

Note that, prior to the transfer step (Step S12) of this embodiment, the tatami mat cover M does not need to be subjected to a pre-treatment, such as application of a polyester solution or the like. This simplifies the work and improves the workability.

In addition, the transfer step of this embodiment adopts batch processing in which an image or the like is transferred from the intermediate transfer medium Ma to the tatami mat cover M on a per-sheet basis, but the transfer step is not limited thereto. For example, the transfer process may be carried out continuously by an device having a roll-to-roll configuration using a roll body of a long intermediate transfer medium Ma and a roll body of a long tatami mat cover M. In this case, a unwinding unit and a winding unit are provided; the unwinding unit unwinds each of the roll body of the intermediate transfer medium Ma and the roll body of the tatami mat cover M, while the winding unit winds each of the tatami mat cover M to which the image or the like is transferred and the intermediate transfer medium Ma that was subjected to the transfer process. Additionally, calender rollers are arranged between the unwinding unit and the winding unit. The calender rollers are a pair of heating and pressing rollers. By pinching together the intermediate transfer medium Ma and the tatami mat cover M being transported, the calender rollers heats and presses the intermediate transfer medium Ma and the tatami mat cover M. As such, the sublimable dye on the intermediate transfer medium Ma sublimates and is thermo-compression bonded to the tatami mat cover M. In this way, the productivity of the tatami mat cover M can be improved.

Next, examples will be described. FIG. 4 is a chart presenting embodiments and evaluation results.

1-1. Example 1

An image was printed on an intermediate transfer medium Ma by the recording device 10. Specifically, a color ink composition containing a sublimable dye, a water-soluble organic solvent, and water was ejected as droplets onto the intermediate transfer medium Ma, forming an image.

Next, the image formed on the intermediate transfer medium Ma was transferred to a tatami mat cover M by the transfer device 20.

The heating temperature in the transfer process was 170° C. The pressure was 0.6 $kg/cm^2$. The heating time was 90 sec.

1-2. Example 2

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 170° C. The pressure was 0.6 $kg/cm^2$. The heating time was 120 sec.

1-3. Example 3

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 170° C. The pressure was 0.6 kg/cm$^2$. The heating time was 180 sec.

1-4. Example 4

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 180° C. The pressure was 0.5 kg/cm$^2$. The heating time was 60 sec.

1-5. Example 5

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 180° C. The pressure was 0.5 kg/cm$^2$. The heating time was 90 sec.

1-6. Example 6

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 180° C. The pressure was 0.5 kg/cm$^2$. The heating time was 120 sec.

1-7. Comparative Example 1

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 150° C. The pressure was 0.6 kg/cm$^2$. The heating time was 180 sec.

1-8. Comparative Example 2

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 160° C. The pressure was 0.6 kg/cm$^2$. The heating time was 180 sec.

1-9. Comparative Example 3

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 185° C. The pressure was 0.6 kg/cm$^2$. The heating time was 60 sec.

1-10. Comparative Example 4

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 190° C. The pressure was 0.6 kg/cm$^2$. The heating time was 60 sec.

1-11. Comparative Example 5

An image was printed on an intermediate transfer medium Ma by the recording device 10. Specifically, a color ink composition same as and/or similar to that in Example 1 was ejected as droplets onto the intermediate transfer medium Ma, forming an image. Note that, the intermediate transfer medium Ma is made of the same material as that used in Example 1. The data of the image formed and recording conditions were the same as those in Example 1.

Next, the image formed on the intermediate transfer medium Ma was transferred to a tatami mat cover M by the transfer device 20.

The heating temperature in the transfer process was 200° C. The pressure was 0.6 kg/cm$^2$. The heating time was 60 sec.

2. Evaluation Method

Next, the evaluation methods will be explained.

2-1-1. Method for Evaluating Discoloration of Tatami Mat Cover M

After the transfer process, the front surface of the tatami mat cover M to which the image was transferred was visually inspected.

2-1-2. Criteria for Evaluating Discoloration of Tatami Mat Cover M

The presence of discoloration on the tatami mat cover M was evaluated.

2-2-1. Method for Evaluating Bleeding of Image

After the transfer process, the image transferred to the tatami mat cover M was visually inspected.

2-2-2. Criteria for Evaluating Bleeding of Image

A: No bleeding at all.
B: Almost no bleeding.
C: Some bleeding observed but still acceptable.
D: Noticeable bleeding which is unacceptable.

2-3-1. Method for Evaluating Color Development of Image

After the transfer process, the image transferred to the tatami mat cover M was visually inspected.

2-3-2. Criteria for Evaluating Color Development of Image

A: Color development is very good.
B: Color development is good.
C: Color development is acceptable.
D: Poor color development which is unacceptable.

2-4. Overall Evaluation

A: Excellent
B: Good
C: Acceptable
D: Unacceptable

3. Evaluation Results 3-1. Discoloration of Tatami Mat Cover M

It was found that discoloration of the tatami mat cover M did not occur when the heating temperature was 180° C. or less but occurred when the heating temperature exceeded 180° C.

3-2. Bleeding of Image

It was found that the image was likely to have almost no bleeding when the heating temperature was 180° C. or less.

3-3. Color Development of Image

It was found that the color development of the image was good when the heating temperature was 170° C. or higher.

3-4. Overall Evaluation

Examples 1 to 6 yielded better results than those of Comparative Examples 1 to 5.

What is claimed is:

1. A method of transfer printing on a tatami mat cover comprising:
- a printing step for performing printing on an intermediate transfer medium using a color ink composition containing a sublimable dye, a water-soluble organic solvent, and water, wherein a percent mass of the water-soluble organic solvent is from 10% to 30% with respect to a total mass of the color ink composition, and
- a transfer step for transferring the print on the intermediate transfer medium to a tatami mat cover, wherein
- the transfer step is performed under conditions of a heating temperature of from 170° C. to 180° C., a pressure of from 0.5 kg/cm2 to 0.6 kg/cm2, and a heating time of from 60 seconds to 180 seconds,
- wherein the tatami mat cover is a woven mat-like member formed by weaving soft rush straws into warp threads.

2. The method of transfer printing on a tatami mat cover according to claim 1, wherein
- a preheating step for heating the tatami mat cover under conditions of a heating temperature of from 170° C. to 180° C. and a heating time of from 60 seconds to 180 seconds is provided after the printing step and before the transfer step.

3. The method of transfer printing on a tatami mat cover according to claim 2, wherein
- the tatami mat cover is pressed under a condition of a pressure of from 0.5 kg/cm2 to 0.6 kg/cm2 in the preheating step.

* * * * *